May 17, 1938.  A. C. RICHARDSON  2,117,503
POWER TAKE-OFF
Filed Dec. 14, 1936
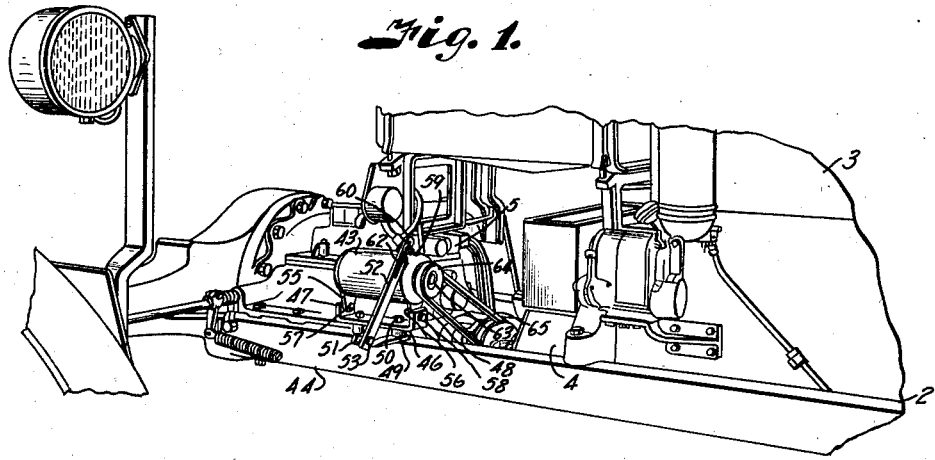
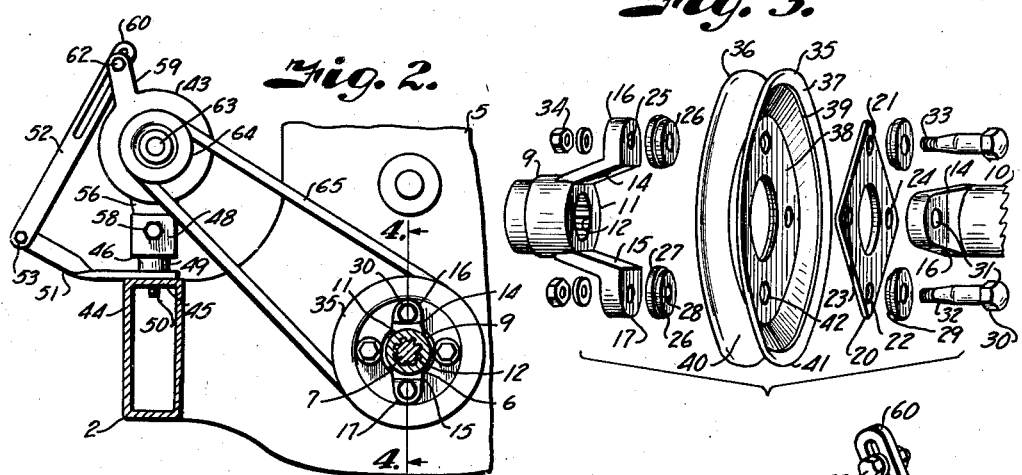
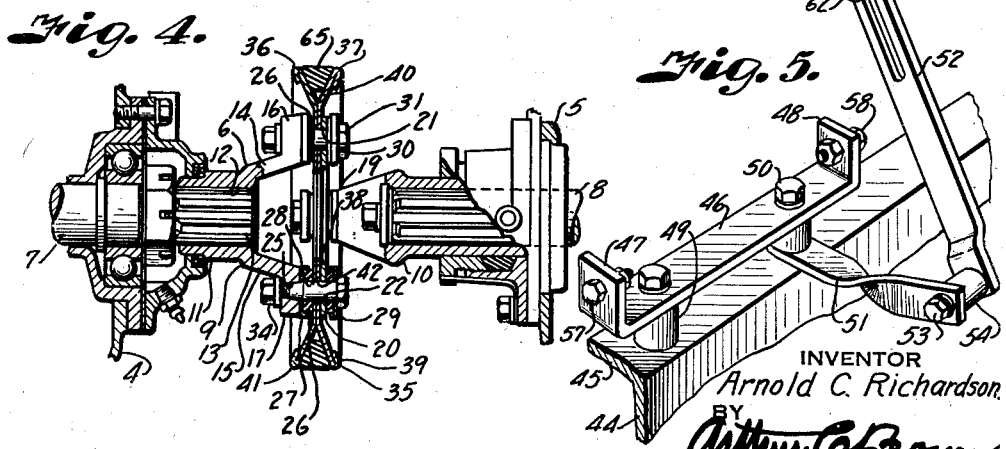
INVENTOR
Arnold C. Richardson
BY
Arthur C. Brown
ATTORNEY Patented May 17, 1938

2,117,503

UNITED STATES PATENT OFFICE 2,117,503

POWER TAKE-OFF

Arnold C. Richardson, Kansas City, Mo.

Application December 14, 1936, Serial No. 115,662

5 Claims. (Cl. 64—22)

This invention relates to a power take-off for tractors, trucks and similar motor vehicles, and particularly to a power take-off adapted for connection with a universal joint on a vehicle.

The principal objects of the invention are to provide a power take-off that is readily installed without removal or replacement of the driving or driven shafts; to provide an installation which eliminates necessity of a split power take-off member; to facilitate mounting of the driven member which is actuated by the power take-off; and to facilitate adjustment of the driving connection between the driven member and the power take-off members.

In accomplishing these and other objects of the invention, as hereinafter pointed out, I have provided improved details of structure, the preferred form of which is illustrated in the accompanying drawing, wherein:

Fig. 1 is a perspective view of a portion of a tractor equipped with a power take-off embodying the features of the present invention.

Fig. 2 is a transverse section through one side of the tractor to better illustrate the power take-off and its driving connection with the driven member, for example a generator used in supplying current to the lighting system of the tractor.

Fig. 3 is a detail perspective view of the power take-off member and the parts of the universal joint with which it is connected, the parts being shown in disassembled spaced relation.

Fig. 4 is an enlarged vertical section on the line 4—4 of Fig. 2.

Fig. 5 is a detail perspective view of the mounting bracket for the driven member that is actuated from the power take-off.

Referring more in detail to the drawing:

1 designates a popular make tractor including a frame 2 carrying a power unit 3, a clutch housing 4 and a transmission 5 located in longitudinal alignment on the frame 2. The clutch housing 4 is spaced from the transmission 5 to accommodate a universal joint 6 for operably connecting the clutch shaft 7 with a transmission shaft 8.

The universal joint 6 is to compensate for any slight misalignment occuring between the shafts and includes a clutch joint member 9 and a transmission joint member 10. The members 9 and 10 are of identical construction and include collars 11 having splined bores 12 to engage the splined ends 13 of the shafts on which the respective members are mounted. Extending angularly from opposite diametric points on the collars are arms 14 and 15 terminating in ears 16 and 17 for the member 9, and 18 and 19 for the member 10. The ears on the respective members are ordinarily connected to a plate 20 of substantially rectangular shape and having pairs of opening 21—22 and 23—24 in the opposite diametrical corners thereof to respectively register with tapered openings 25 in the ears 16 and 17 of the member 9, and with the corresponding openings in the ears 18 and 19 of the member 10.

Inserted between the ears and the plate are flexible washers 26 that are contained in metal caps 27 having openings 28 registering with the openings previously described. Extending through similar flexible washers 29 contacting the outer side of the plate, through the openings 21 and 22 in the plate, and through the openings 25 in the ears 16 and 17 are screws 30, having heads 31 engaging the washers 29 and tapered shanks 32 engaging in the openings of the ears. The screws have threaded terminals 33 projecting from the ears of the joint member 9 and on which are threaded nuts 34 for drawing the parts in fixed assembly. Similar screws are extended from the opposite side of the plate through the openings 23 and 24 to connect the member 10. With the parts thus assembled the flexible washers allow sufficient flexibility of the joint to compensate for any slight misalignment of the clutch and transmission shafts so as to eliminate possible wear on their supporting bearings.

The tractor as above described is not equipped with a power take-off for driving a generator for the lighting system or other small accessories to be actuated by the motive power of the tractor, and as above pointed out, it is the purpose of the present invention to provide a power take-off which may be readily connected with the universal joint of the tractor to permit operation of a generator or the like.

In carrying out the present invention, I provide for connecting the power take-off member with the universal joint, as now to be described. The power take-off member illustrated includes a pulley 35 which is preferably formed of sheet metal stampings 36 and 37. Each stamping includes a ring-like web portion 38 having an outwardly flaring flange 39 so that when the stampings are placed in juxtaposition with the web portions 38 in abutting relation the flanges cooperate in forming a V-shaped groove 40 extending about the periphery of the pulley. The peripheries of the flanges are preferably bent retractively so as to provide smoothly rounded edges 41. The stampings when placed in juxtaposition are secured together by spot welding or the like to form a unitary pulley structure having a relatively thin attaching web adapted to be secured between the members 9 and 10 of the universal joint, the web of the pulley being provided with openings 42 registering with the openings in the plate 20.

In installing the power take-off member the screws 30 are removed by unthreading the nuts and withdrawing them from the joint members to release the plate 20. The plate 20 is then reduced in thickness, or a new plate substituted having a thickness so that the combined thickness of the pulley web and plate correspond to the original plate 20 with which the universal joint is equipped.

With the joint members turned the proper angles relatively to each other, the pulley, including the plate 20, may be readily slid therebetween after which the joint members are moved so that the openings in the ears thereof are located in proper alignment with the openings in the plate 20 and web of the pulley. The flexible washers carried by their metal caps are inserted so that those on one side engage against the outer face of the plate 20 and those on the other side engage against the outer face of the pulley web. The screws are then replaced and secured by the nuts. When the pulley is thus installed it is securely retained by the joint members and while there might be slight wabbling movement thereof, it is hardly perceptible and has no effect on the driving connection of the power take-off.

While I have particularly illustrated the power take-off member as a composite pulley, it is obvious that it may be formed of a single casting. It is also obvious that a sprocket or a gear with a similarly formed web might be substituted for the pulley shown without departing from the spirit of the invention.

In the present instance, I have illustrated the power take-off as actuating an electric generator 43 that is pivotally mounted on the side sill 44 of the tractor frame as now to be described. Secured to the upper wall 45 of the sill is a strap-like bracket 46 having upturned ends 47 and 48. The bracket 46 is spaced from the flange of the sill by sleeves 49 through which the bracket fastening devices 50 are extended when securing the bracket to the sill. Inserted under one of the spacing sleeves and retained by the fastening device extending therethrough is an arm 51 projecting outwardly from the frame and having its outer end pivotally supporting a brace arm 52, the brace arm 52 being connected with the arm 51 by a bolt 53 extending through a spacing sleeve 54 as best shown in Fig. 5. The generator 43 has depending lugs 55 and 56 that are pivotally connected with the ends 47 and 48 of the bracket 46 by fastening devices 57 and 58. Also extending radially from the opposite diametrical side of the generator is a lug 59 that is connected with the slotted end 60 of the brace arm 52 by a bolt 62 as shown in Fig. 5.

In the illustrated instance the armature shaft 63 of the generator carries a grooved pulley 64 aligning with the power take-off member previously described. Operating within the grooves of the respective pulleys is a belt 65 to effect actuation of the generator through the power take-off on the universal joint. To properly tension the belt the generator 43 is pivotally adjusted upon its supporting bracket by loosening the bolt 62 and rocking the generator in the desired direction relatively to the brace arm 52, after which the bolt 62 is retightened to support the generator in adjusted position. If it is desired to use an endless belt, it may be applied when the universal joint members are disconnected to permit installation of the power take-off member, as previously described.

From the foregoing, it is obvious that I have provided a power take-off which is of relatively inexpensive construction and which is readily installed for actuating the generator as illustrated, or other similar accessories attached to the vehicle.

What I claim and desire to secure by Letters Patent is:

1. In combination with a universal joint including a pair of joint members, a power take-off member having a web portion interposed between said joint members, and fastening devices separately connecting the respective joint members with said web portion of the power take-off member.

2. In combination with a universal joint including a pair of joint members, a power take-off member having a web portion interposed between said joint members, fastening devices separately connecting the respective joint members with said web portion, and flexible means between said web portion and the joint members to compensate for variation in movement of the joint members.

3. In combination with a universal joint including a pair of joint members, a connecting plate interposed between said members, a power take-off member having a web portion interposed between said members in juxtaposed relation with the connecting plate and fastening devices separately connecting the respective joint members through said plate and web portion of the power take-off member.

4. In combination with a universal joint including a pair of joint members, a connecting plate interposed between said members, a power take-off member having a web portion interposed between said members in juxtaposed relation with the connecting plate, fastening devices separately connecting the respective joint members through said plate and web portion of the power take-off member, and flexible means on said fastening devices to compensate for variation in movement of the joint members.

5. In combination with a universal joint including a pair of joint members having radially extending arms terminating in apertured ears and arranged with the arms on one member in staggered relation to the arms of the other member, a power take-off member having an annular web portion interposed between said ears, a connecting plate interposed between said ears in juxtaposed relation with said web portion, fastening devices extending through said ears, said web portion and connecting plate to secure the joint members together and to support the power take-off member, and flexible means on said fastening devices to compensate for variation of the joint members.

ARNOLD C. RICHARDSON.